United States Patent Office 3,435,793
Patented Apr. 1, 1969

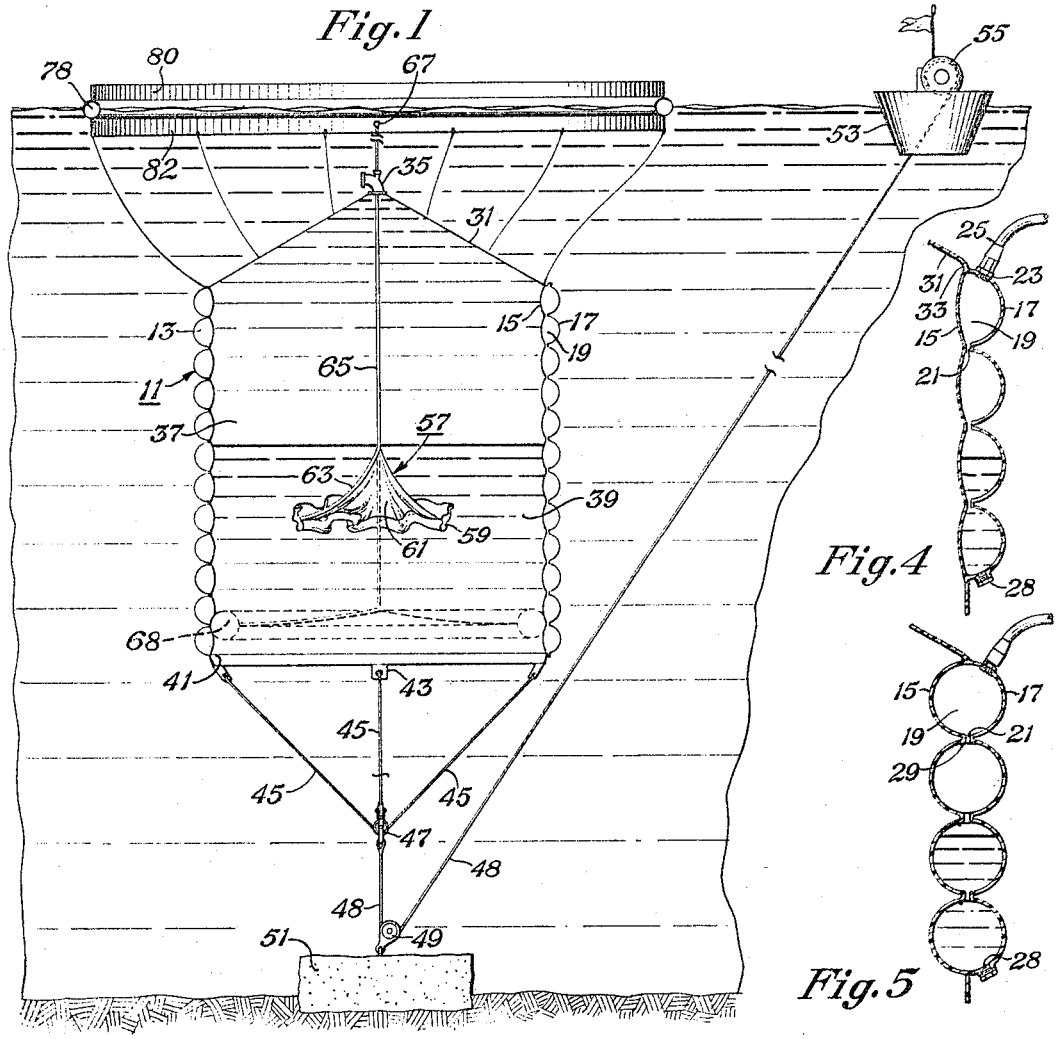
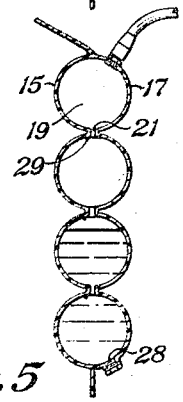
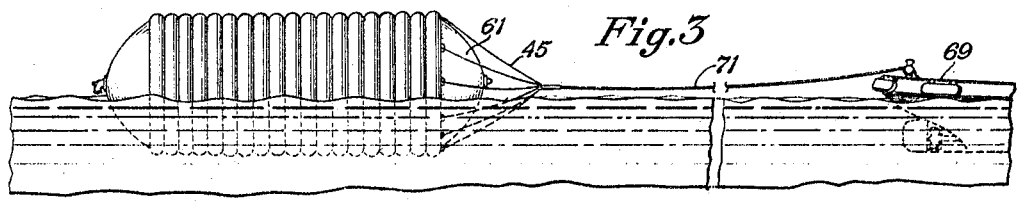
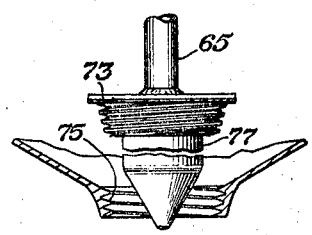

3,435,793
PORTABLE SUBMARINE TANKS
Wood B. Shurtleff, 8113 Rush St.,
Fort Worth, Tex. 76116
Filed Apr. 11, 1967, Ser. No. 630,107
Int. Cl. B65d *89/10, 25/00*
U.S. Cl. 114—.5                                    11 Claims

ABSTRACT OF THE DISCLOSURE

Disclosed herein is a portable submarine tank for storing or transporting petroleum or other lighter than water, miscible fluids. The tank is constructed of a collapsible, fluid impervious material, having a generally cylindrical wall and an enclosing top, but having an essentially open bottom when in the storage position. Inner and outer walls are inflated with a selected fluid to increase the rigidity of the structure, and the type and quantity of fluid varied to regulate buoyancy. The walls may be compartmented, but interconnected with fluid passages containing check valves to minimize fluid loss in the event of rupture in a wall of one compartment. A pressure relief valve may be disposed in one of the compartments, generally the lower compartment, to enable expulsion of one fluid with another to vary buoyancy. A suitable connection in preferably the top of the tank is used to fill it with petroleum or the like, which communicates through the open bottom with the water surrounding the structure. Securing elements such as cables depend from the tank to a submersed anchor and to releasable fastener means to enable selection in tank elevation. A sealing element is carried by the tank so that the opening in its bottom may be closed. Thereafter, release from the submersed anchor permits the tank to be towed for transporting fluid.

Background of the invention

Previously, means have been suggested for storing petroleum and other lighter-than-water fluids in vessels disposed in bodies of water. Previously suggested devices have, however, a number of significant disadvantages. If the tanks are constructed of metal, for instance, the corrosion problem becomes significant. In addition the use of rigid materials complicates transportation. In addition, such devices cannot be economically or conveniently transported to additional locations for re-use. Further, previously known devices have extensive portions extending from the water, and are thus vulnerable to damage by wind and waves which have damaging effects, especially during storm conditions. Moreover, they cannot be conveniently moved to newly selected locations.

Broad description of the invention

The present invention is a tank which may be used for both storage and transportation, being formed of a flexible material such as rubber, neoprene, nylon, or calendered rubber or neoprene such that it may be collapsed and transported even by air to a selected location. Further, it is adapted for total submersion for camouflage in military applications, or to avoid the destructive forces commonly encountered above the surface of the water. Means for varying the buoyancy are provided to enable control over its elevation in the water. In addition it may have an open bottom through which impurities may settle during storage but which may be closed to form a suitable vessel for transporting selected fluids such as petroleum.

Brief description of the drawing

FIG. 1 is a side elevational view in longitudinal section of a portable submarine tank constructed in accordance with the principles of my invention; FIG. 2 is a fragmentary side elevational view, partially in longitudinal section, of a sealing element that may be substituted for the sealing element shown in the FIG. 1 embodiment; FIG. 3 is a side elevational view of my portable submarine tank having the lower opening closed by a sealing element while the tank is in the horizontal towing position; FIG. 4 is a fragmentary side elevational view of a preferred inner and outer wall construction for the tank; and FIG. 5 is an alternate inner and outer wall construction.

Description of a preferred embodiment

The numeral 11 in the drawing designates in general a portable submarine tank having a collapsible, generally cylindrical wall 13 preferably constructed of a fluid impervious material such as rubber, neoprene, nylon, calendered rubber or neoprene or other material compatable with petroleum or other selected miscible, lighter-than-water fluids. In this instance the wall 13 has an inner section 15 and an outer section 17 secured to each other at spaced intervals along the length of the tank to define annular compartments 19. As shown in FIGS. 4 and 5, each compartment 19 is in fluid communication with the adjacent compartments by utilization of passages 21. A fastener 23 is disposed preferably in the upper compartment for communication with a removable connector 25 which extends to a pressurized fluid source such as an air compressor, for example (not shown).

Also, a pressure relief valve 28 of selected pressure rating is preferably disposed in the lowermost compartment. Consequently, the compartments may be filled with a selected fluid such as water to establish a selected buoyancy of the tank, and also, an additional fluid such as air may be thereafter urged into the compartments to expel the initial fluid through the pressure relief valve 28 to selectively vary the buoyancy of the tank.

There are a variety of methods by which the inner and outer walls 15, 17 and the compartments 19 may be fabricated. Referring to FIG. 4, the inner wall may be manufactured of a cylindrical sheet of flexible and impervious material such as rubber and the outer wall 17 bonded thereto at selected locations to form suitable compartments 19. Alternatively, the inner and outer walls 15, 17 may be formed of a separate torus and bonded to similar, adjacent tori as shown in FIG. 5. To minimize fluid loss and buoyancy variation in the unlikely event of puncture of the outer wall, it is preferable that check valves 29 be disposed in the passages 21 between the cavities 19.

As oriented in FIG. 1, the upper extremity of the tank has a top closure 31 also formed of a pliable but fluid impervious material having its periphery bonded to preferably the upper compartment as indicated by the numeral 33 in FIG. 4. The term "closure" encompasses permanently closed structures as well as structures having portions that may be opened (as a hinged hatch for example) through which a hose or equivalent may be inserted for the introduction or withdrawal of fluid from the tank. Bonded to the top closure 31 is a connection means 35, here a pipe fitting, which includes a suitable valve to control the flow of stored fluid to or from the tank.

As shown in FIG. 1, petroleum or other selected fluid 37 fills the upper region of the tank while water 39 fills the lower region. Notice that the bottom 41 of the tank is open to permit entrance of the water in which the tank is disposed. Consequently, lighter-than-water stored fluid is urged toward the top closure 31 and impurities permitted to precipitate from the tank.

Since the density of the fluid 37 is less than that of the water 39, the tank will have a positive buoyancy, causing its upper region to extend normally beyond the surface of the water.

The lower region of the tank is provided with plates which are bonded or otherwise suitably secured to the wall to receive securing elements 45 such as cables. Such cables preferably extend to a self-centering device such as a double pulley 47, and a lower portion 48 extends downward to a submersed anchor or securing means 51 disposed beneath the tank. In this instance the anchor is a block of heavy material which carries a pulley 49. The opposite extremity of the cable 48 may extend to a buoy 53 having a spool 55 thereon to receive cable.

The securing elements 45, 47, 48 and anchor 51 maintain a selected tank location and simultaneously maintain a selected tank elevation by counteracting the positive buoyancy resulting from the presence of fluids less dense than water in the tank. The buoy 53 and spool 55 have locking means thereon (not shown) such that they constitute releasable fastener means to regulate the elevation of the tank. Alternatively, the pulley 49 may be a remotely controlled releasable fastener.

In instances where the tank is utilized as a storage means, as shown in FIG. 1, its opening 41 remains open to permit essentially unrestricted entrance or exit of water. However, when using the tank as a fluid transport as shown in FIG. 3, a sealing element 57 (see FIG. 1) which may include an annular, hollow and inflatable peripheral portion 59 and an interior impermeable membrane 61, is utilized. A hose or other suitable conduit 63 extends from the annular hollow portion 59 to a centrally disposed, here rigid, conduit 65 that extends to the top closure 31 of the tank and in this instance sealingly through the connection means 35. Conduit 65 has a valve 67 which may be opened and attached to a source of fluid, such as an air compressor, to inflate the peripheral portion 59 until it engages the wall 13 as indicated in phantom by the numeral 68 in FIG. 1. Consequently, the annular, hollow and inflatable portion 59 has a peripheral diameter that is slightly larger than the inner diameter of the wall. The elevation of the lower end of conduit 65 may be varied such that the inflatable portion 59 engages the wall at a selected location. Alternatively, the hollow portion 59 may be inflated through a conduit that extends, for example, to buoy 53, and positioner means other than rigid conduit 65 utilized.

With the bottom of the tank closed as described above, the releasable fastener means may be released to enable the tank to assume the towing position shown in FIG. 3 such that a boat 69 may be connected with the securing elements 45 by means of a tow line 71. The membrane 61 of sealing element may assume an arcuate or rounded contour and the draft of the vessel varied by control of the quantity and type fluid disposed in the compartments 19 between the walls 15, 17 of the tank.

An alternate form of sealing element is illustrated in FIG. 2 where a rigid hatch 73, herein the form of a threaded cylindrical body, communicates with a mating peripheral portion 75 of the opening. The conduit 65 shown in FIG. 1 may be secured to the hatch 73 and rotated from above the top closure 31 to seal or open the tank. To facilitate easier insertion of the threaded portion of the hatch into the threaded peripheral portion 75 of the opening a guide means 77 may depend from the lower surface of the hatch to extend into the opening. There are a number of methods by which the opening may be selectively opened or closed and the invention in its broadest sense is not limited to any particular form of closing means. Similarly, the means used to introduce fluid into the tank need not necessarily be the connection means 35 shown in FIG. 1 and can include devices for inserting fluid through the bottom as well as other portions of the tank. Similarly, the geometric forms disclosed for the various components, the materials used, the type securing elements and anchoring means, and the releasable attaching means can be varied widely.

To minimize loss of stored fluid accidentally a fluid barrier fence 78 that floats on the surface and includes upper and lower annular fins 80, 82 may be utilized. If so, means such as cable 84 extend from the fence to the tank to prevent separation of fence and tank and to insure that a maximum amount of stored fluid is retained after accidental loss.

In operation, a portable submarine tank as described above may be transported conveniently to the desired location since it may be deflated and collapsed to a surprisingly small volume. Thus, it may be flown to the selected location. After it is disposed in the water, the removable connector 25 (see FIG. 4) may be connected to the fastener 23 and a relatively heavy fluid such as water introduced to the compartments 19 between the walls 15, 17. Thus rigidity is added to the structure and it assumes a cylindrical shape. The securing elements have been previously secured to the rigid plates 43 on the bottom of the tank, being connected by cable 48 with the submerged anchor 51. The elevation of the tank is controlled by winding or releasing the cable 48 on the drum 55 associated with buoy 53. Power means, permanently or temporarily attached to the buoy, are utilized for this purpose. Preferably before submersion of connection 35 on top of the tank, fluid such as petroleum is introduced into the tank. Since petroleum is miscible and has a lighter density than water it accumulates in the upper regions of the vessel. The bottom of the tank is left open and impurities such as sand freely precipitate from the tank through the petroleum and water.

To utilize the tank as a transporting vessel, the sealing element 57, such as the inflatable portion 59 shown in FIG. 1, is expanded until it closes the bottom of the vessel. Then the securing elements are released from confinement by the releasable fastener means such as the spool 55 on buoy 53. Thereafter, the vessel may be secured to a suitable towing line of a boat 69 and utilized as a transportation means as shown in FIG. 3.

It should be apparent from the foregoing that I have provided an invention having significant advantages. The construction of the apparatus from a suitable collapsible material such as rubber eliminates corrosion problems. The open bottom construction enables foreign particles to settle from the petroleum, resulting in an improvement in its quality. The ability to regulate the buoyancy of the vessel facilitates its complete submersion in the water to minimize possible damage from surface waves and wind. Storage in this manner also minimizes fire hazards since the widespread atmospheric temperature variations which liberate gas from petroleum products are avoided by total submersion. The double wall construction, when utilized, lessens chances for loss through accidental puncture of the wall. Further, the bottom of the tank may be conveniently closed and the releasable sealing means released to enable towing of the vessel and use therefore as a transporting vessel. Even in instances where a permanent bottom is utilized significant advantages are realized, but it becomes necessary to periodically clean the tank bottom to remove precipitated particles, especially when crude petroleum is stored in the tank.

While I have shown my invention in only a few of its forms, it should be apparent to those skilled in the art that it is not so limited but is susceptible to various changes and modifications without departing from the spirit thereof.

I claim:

1. A portable submarine tank for storing or transporting petroleum or other fluids, said tank comprising:
   a collapsible wall constructed of a flexible and fluid impervious material;
   a top closure also constructed of a fluid impervious material sealingly secured to said wall;

connection means communicating with said tank to enable introduction of fluids;

the bottom of said wall having an opening to permit entrance of the water in which the tank may be vertcially disposed, whereby lighter-than-water fluids such as petroleum are urged toward the top closure and impurities permitted to fall through said opening from the tank;

anchor means disposed beneath said tank;

securing elements attached to the tank and to said anchor means to maintain a selected tank location and elevation;

releasable fastener means connected with said securing elements for selectively varying the tank elevation; and a sealing element carried by the tank to communicate with the opening in the bottom of said wall to enable closure thereof and towing of said tank and the fluid therein upon release from said anchor means.

2. The portable submarine tank defined by claim 1 wherein said sealing element comprises a rigid hatch confined to said tank to communicate with said opening; fastener means carried by at least one of said hatch and the peripheral portion of the opening; and actuator means communicating between the fastener means and the surface to enable remote control over the fastener means.

3. The portable submarine tank defined by claim 2 wherein said hatch comprises a cylindrical body threaded on its exterior, with the peripheral portion of the opening being similarly threaded to receive said hatch.

4. The portable submarine tank defined by claim 1 wherein said sealing element comprises an annular, hollow and inflatable portion of slightly larger diameter when inflated than the opening to be sealed; a membrane sealingly secured and extending across said annular portion; pressurization means connected with said annular portion to fill and expand it; and actuator means communicating between the surface and the pressurization means to enable selective opening or closing of said opening.

5. The portable submarine tank defined by claim 1 wherein said walls are vertically separated compartments with check valves disposed in the passageways therebetween to enable fluid flow in only the downward direction.

6. A portable submarine tank for storing or transporting petroleum or other fluids, said tank comprising:

a collapsible wall constructed of a flexible and fluid impervious material, said wall comprising hollow rings, with each said ring being secured to the rings immediately adjacent it and having passageways extending therebetween for inflation of the rings, adding rigidity and buoyancy or counterbuoyancy to the structure;

a top closure also constructed of a fluid imperivous material sealingly secured to said wall;

connection means communicating with said tank to enable introduction of fluids;

the bottom of said wall having an opening to permit entrance of the water in which the tank may be vertically disposed, whereby lighter-than-water fluids such as petroleum are urged toward the top closure and impurities permitted to fall through said opening from the tank;

anchor means disposed beneath said tank; and securing elements attached to the tank and to said anchor means to maintain a selected tank location and elevation.

7. The portable submarine tank defined by claim 6 wherein check valves are disposed in said passages to enable fluid flow in only one direction; connection means is carried by a ring on one extremity of the tank to enable pressurization; and a pressure relief valve is carried by the ring on the opposite extremity.

8. A portable submarine tank for storing or transporting petroleum or other fluids, said tank comprising:

a collapsible wall constructed of a flexible and fluid impervious material;

top and bottom closures also constructed of a fluid impervious material sealingly secured to said wall;

connection means communicating with said tank to enable introduction of fluids;

anchor means disposed beneath said tank;

securing elements attached to the tank and anchor means to maintain a selected tank location and elevation;

releasable fastener means connected with said securing elements for selectively varying the tank elevation; and said walls being vertically separated compartments with check valves disposed in the passageways therebetween to enable fluid flow in only the downward direction.

9. The portable submarine tank defined by claim 8 wherein said walls comprise hollow rings formed of flexible material, with each said ring being secured to the rings immediately adjacent it, and having passageways extending therebetween for inflation of the rings, adding rigidity and buoyancy or counterbuoyancy to the structure.

10. The portable submarine tank defined by claim 9 wherein check valves are disposed in said passages to enable the fluid flow in only one direction; connection means is carried by a ring on one extremity of the tank for pressurization; and a pressure relief valve is carried by the ring on the opposite extremity.

11. A water submersible storage tank for petroleum or other lighter-than-water fluids, said tank comprising:

a collapsible wall constructed of a plurality of hollow fluid impervious flexible rings;

a top closure also constructed of a liquid and gas impervious material sealingly secured to said wall;

the bottom of said wall having an opening to permit entrance of water in which the tank may be vertically disposed, whereby lighter-than-water fluids such as petroleum are urged toward the top closure and impurities permitted to fall through said opening from the tank;

submersed securing means disposed beneath said tank to communicate with the underwater bottom;

securing elements attached to said tank and to said submersed securing means to maintain a selected tank location and to maintain a selected tank elevation by counteracting the positive buoyancy resulting from the introduction of fluids having a lower specific gravity than water; and check valves disposed in said passages to enable fluid flow only in the downward direction through said rings.

References Cited

UNITED STATES PATENTS 3,067,712  12/1962  Doerpinghaus.
3,327,667  6/1967  Manning.
3,339,512  9/1967  Siegel.

TRYGVE M. BLIX, *Primary Examiner.*

U.S. Cl. X.R.

220—85